United States Patent
Kustra et al.

(10) Patent No.: US 11,423,553 B2
(45) Date of Patent: Aug. 23, 2022

(54) CALIBRATION OF IMAGE-REGISTRATION BASED TRACKING PROCEDURES

(71) Applicant: KONINKLIJKE PHILIPS N.V., Eindhoven (NL)

(72) Inventors: Jacek Lukasz Kustra, Eindhoven (NL); Stéphane Allaire, Nanterre (FR)

(73) Assignee: KONINKLIJKE PHILIPS N.V., Eindhoven (NL)

(*) Notice: Subject to any disclaimer, the term of this patent is extended or adjusted under 35 U.S.C. 154(b) by 77 days.

(21) Appl. No.: 16/763,124

(22) PCT Filed: Nov. 5, 2018

(86) PCT No.: PCT/EP2018/080082
§ 371 (c)(1),
(2) Date: May 11, 2020

(87) PCT Pub. No.: WO2019/091883
PCT Pub. Date: May 16, 2019

(65) Prior Publication Data
US 2020/0294253 A1 Sep. 17, 2020

(30) Foreign Application Priority Data
Nov. 13, 2017 (EP) .................................. 17290149

(51) Int. Cl.
*G06K 9/00* (2022.01)
*G06T 7/33* (2017.01)
(Continued)

(52) U.S. Cl.
CPC ................ *G06T 7/33* (2017.01); *G06T 5/002* (2013.01); *G06T 5/20* (2013.01); *G06T 7/0012* (2013.01);
(Continued)

(58) Field of Classification Search
None
See application file for complete search history.

(56) References Cited

U.S. PATENT DOCUMENTS

| | | | |
|---|---|---|---|
| 2006/0074292 A1* | 4/2006 | Thomson | A61B 6/12 600/411 |
| 2014/0037161 A1 | 2/2014 | Rucker | |
| 2020/0038683 A1* | 2/2020 | Schadewaldt | A61N 5/1038 |

OTHER PUBLICATIONS

Volz et al., "Targeted Contrast-Enhanced Ultrasound for Inflammation Detection: A Review of Current Evidence", Journal of Diagnostic Medical Sonography, 2017 (Year: 2017).*

(Continued)

*Primary Examiner* — Randolph I Chu
(74) *Attorney, Agent, or Firm* — Sherry Austin

(57) ABSTRACT

The invention relates to a system and method for tracking at least one anatomic structure by means of an image-registration based tracking procedure using at least one parameter, where the anatomic structure includes a plurality of implanted markers. A parameter setting (6, 7) unit is configured to determine measured positions of the implanted markers in each image of a series of images acquired using an imaging unit (1), and to perform an optimization procedure to determine an optimized value of the at least one parameter on the basis of deviations between the measured and calculated positions. Then, the position of the anatomic structure is tracked in further images by means of the tracking procedure using the optimized value of the at least one parameter.

13 Claims, 2 Drawing Sheets

(51) Int. Cl.
G06T 5/00 (2006.01)
G06T 5/20 (2006.01)
G06T 7/00 (2017.01)

(52) U.S. Cl.
CPC ............ G06T 2207/10132 (2013.01); G06T 2207/30204 (2013.01)

(56) References Cited

OTHER PUBLICATIONS

Somphone et al., "Fast Myocardial Motion and Strain Estimation in 3D Cardiac Ultrasound With Sparse Demons", 2013 IEEE 10th International Symposium on Biomedical Imaging). (Year: 2013).*
PCT International Search Report, International application No. PCT/EP2018/080082, dated Dec. 6, 2018.
Schmidt-Richberg Alexander et al: "Landmark-Driven Parameter Optimization for Non-Linear Image Registration", Medical Imaging 2011: Image Processing, SPIE, 1000 20th St. Bellingham WA 98225-6705 USA, vol. 7962, No. 1, Mar. 3, 2011 (Mar. 3, 2011), pp. 1-8.
Murphy M.J. et al., "Adaptive Motion Compensation Therapy" In: "Adaptive Motion Compensation Therapy", Nov. 3, 2011 (Nov. 3, 2011), XP055527084.
Somphone O. et al., "Live Feature Tracking in Ultrasound Liver Sequences with Sparse Demons" Proceedings of MICCAI'14 workshop, 2014, pp. 53-60 (SPEC & ID).
Somphone O. et al., "Fast Myocardial Motion and Strain Estimation in 3D Cardiac Ultrasound with Sparse Demons" Proceedings of ISBI'13, 2013, pp. 1182-1185 (SPEC & ID).
Cunha J. A. et al., "Design of an Easily-Constructed Deformable Phantom for Evaluation of Intra-Operative Adaptive Brachytherapy Platforms", Brachytherapy, vol. 14 , S24-S25 (2015).
"Fiducial Marker Placement", RadiologyInfo Downloaded From the Internet May 8, 2020.
Vavassori A. et al., "Intraprostatic Fiducial Markers: A Potential Application for Ultrasound-Guided Radiotherapy in Prostate Cancer", ecancermedicalscience, 3:143, Dec. 2009.
Lian J. et al., "Prostate Deformation from Inflatable Rectal Probe Cover and Dosimetric Effects in Prostate Seed Implant Brachytherapy", Med Phys, 43 (12), 2016, pp. 6569-6576.
Baumann M. et al., "Prostate Biopsy Tracking with Deformation Estimation", Medical Image Analysis, Elsevier, Jul. 2011.

* cited by examiner

CALIBRATION OF IMAGE-REGISTRATION BASED TRACKING PROCEDURES

CROSS-REFERENCE TO RELATED APPLICATIONS

This patent application claims the priority benefit under 35 U.S.C. § 371 of International Patent Application no. PCT/EP2018/080082 filed Nov. 5, 2018, which claims the benefit of European Patent Application No. EP17290149.8, filed on Nov. 13, 2017. These applications are hereby incorporated by reference herein in their entirety.

FIELD OF THE INVENTION

The invention relates to the tracking of anatomic structures in images by means of image registration-based tracking procedures. More specifically, the invention is related to a system and a method for tracking at least one anatomic structure in consecutively acquired images of a patient body by means of an image-registration based tracking procedure.

BACKGROUND OF THE INVENTION

The automated tracking of anatomic structures in two-dimensional (2D) and three-dimensional (3D) images is an important task in adaptive radiation therapy and in further modern image-guided interventional and therapeutic procedures. One known approach for tracking changes of an anatomic structure uses fiducial markers which are implanted in the relevant anatomic structures. In adaptive radiation therapy, the markers particularly allow for aligning treatment devices to the patient's target anatomy. However, the marker-based tracking is limited to the tracking of a relatively small number of particular positions and does not allow for tracking changes of complete anatomic structures.

For this purpose, an image registration-based tracking procedure may be applied. In such a procedure, the relevant anatomic structures are segmented in a reference image in order to determine their positions and contours at a certain point in time (corresponding to the acquisition time of the reference image). Then, changes of the positions and contours of the segmented anatomic structure may be determined using deformable image registration (DIR). In DIR, voxels of two images are transformed into the same coordinate space, which may particularly be the coordinate space of one of the images, where the transformation can involve translations and rotations of voxels as well as deformations of voxels' shapes. The resulting transformations, which include so-called deformation vector fields, may then be applied to the segmented anatomic structures in order to determine changes of their positions and shapes between two images.

DIR algorithms which may be used in this approach usually include one or more configurable parameters which have to be adapted to the special situation in which the DIR is carried out. For instance, these parameters may include an elasticity parameter quantifying the elasticity of the transformed and/or a filter parameter for filtering the images used for carrying out the DIR.

The elasticity parameter should be adapted to the elasticity of the tissue of the anatomic structure to which the DIR relates and the filter parameter should particularly be adapted to the noise in the images used for the DIR and further quality parameters thereof, which depend on the imaging setup actually used. However, the tissue elasticity of the anatomic structures of interest is usually not exactly known. Therefore, the value of the elasticity parameters is often estimated on the basis of typical values of comparable tissue in practical implementations. Likewise, the filter parameter can usually not exactly be determined and is typically set to an estimate derived from past experience.

As a consequence, the values of the parameters of the DIR algorithm are often not selected in an optimal way. This can lead to non-negligible inaccuracies in the tracking of the changes of the anatomic structures which translate into corresponding inaccuracies in the treatment procedures using the image registration-based tracking. For instance, in the aforementioned case of a radiation therapy treatment, these inaccuracies may result in a sub-optimal radiation dose distribution delivered to the target structure and/or the OARs.

The publication A. Schmidt-Richberg et al, "Landmark-driven Parameter Optimization for non-linear Image Registration", Medical Imaging 2011: Image Processing, Proc of SPIE Vol. 7962, doi: 10.1117/12.877059 relates to a procedure for optimizing a regularization parameter of a non-linear intensity-based image registration, which indicates to which extent the image transformation is required to be smooth. In the procedure, anatomical landmarks, such as bifurcations in vessel trees or in the bronchial tree, are identified. Then, the regularization parameter is optimized by minimizing the target registration error defined as the mean distance between a landmark in a moving image and the corresponding landmark in the fixed image after registration.

SUMMARY OF THE INVENTION

It is an object of the present invention to provide for a more accurate image registration-based tracking of anatomic structures of interest on the basis of a series of images.

In one aspect, the invention suggests a system for tracking at least one anatomic structure in consecutively acquired images of a patient body by means of an image-registration based tracking procedure using at least one parameter, the anatomic structure including a plurality of implanted markers. The system comprises a parameter setting unit configured to:

determine measured positions of the implanted markers in each image of a series of images acquired using an imaging unit, and perform an optimization procedure to determine an optimized value of the at least one parameter on the basis of deviations between the measured positions of the implanted markers as determined in the images and the calculated positions of the implanted markers as determined by means of the tracking procedure.

Moreover, the system comprises a tracking unit configured to track the position of the anatomic structure in further images by means of the tracking procedure using the optimized value of the at least one parameter.

The parameter setting unit configured in the aforementioned way allows for adapting the tracking procedure to the specific circumstances under which the anatomic structure is tracked. Hereby, the accuracy of the tracking of the anatomic structure is improved. More specifically, since the optimized values of the at least one parameter is determined on the basis of the deviations between the positions of the markers as determined in the images and as calculated by means of the tracking procedure applied to images of the anatomic structure to be tracked, it is particularly possible to adapt the tracking procedure to the specific anatomic structure.

Moreover, the series of images used for determining the optimized values of the at least one parameter the further images used for tracking the anatomic structure may be acquired using the same imaging unit or imaging units of the same type, particularly imaging units using the same imaging modality. Since the optimized values of the at least one parameter is determined on the basis of the deviations between the positions of the markers as determined in the images and as calculated by means of the tracking procedure applied to images acquired using the same imaging unit which is also used for tracking the anatomic structure or an imaging unit of the same type, the tracking procedure can be adapted to the specific imaging unit or type of imaging unit.

In the determination of the optimized values of the at least one parameter, the measured positions of the markers determined in the images may serve as a ground truth and the parameter setting unit preferably sets the at least one parameter such that the positions of the markers as determined using the tracking procedure correspond to the positions of the as determined in the images to the best possible extent.

For this purpose, the parameter setting unit may determine the optimized value of the at least one parameter such that the deviations between the measured positions of the markers as determined in the images and the calculated positions of the markers are minimized. In particular, the optimized value of the at least one parameter may be determined by minimizing a cost function depending on differences between the measured positions of the markers and the calculated positions of the markers.

In one embodiment of the invention, the tracking procedure comprises smoothing the images by applying a smoothing filter and the at least one parameter comprises a filter parameter of the smoothing filter. The filter parameter may particularly specify an amount of smoothing. By means of the smoothing, it is particularly possible to reduce noise in the images, which is generated during the image acquisition by means of the imaging unit, to thereby improve the image quality in view of the tracking of the anatomic structure. By adapting the filter parameter, the smoothing can be adapted to the image quality of the images acquired by means of the imaging unit and particularly to the noise included in these images.

In a further embodiment of the invention, the at least one parameter comprises an elasticity parameter quantifying an elasticity of the at least one anatomic structure. In the imaging registration-based tracking procedure, this parameter ensures that the imaged anatomic structure is transformed in a realistic manner in accordance with the characteristics of its tissue, particularly in accordance with the tissue's elasticity. By adapting the elasticity parameter, the tracking procedure can thus be adapted to the tissue characteristics of the anatomic structure to be tracked.

In one embodiment of the invention, the tracking procedure involves a deformable image registration between each of the further images and a reference image on the basis of a deformation vector field, the deformation vector field being regularized on the basis of a filter function, and the at least one parameter comprises a parameter of the filter function. In DIR, this filter parameter usually plays the role of the elasticity parameter so that the DIR algorithm applied in the tracking procedure can be adapted to the tissue characteristics of the anatomic structure to be tracked by adapting the filter parameter.

A related embodiment of the invention comprises that the DIR is carried out on the basis of a demons algorithm, particularly on the basis of a sparse demons algorithm. In demons-based DIR algorithms, image entities of a reference image drive the deformation of the image elements of the deformed image and this image is determined on the basis of a deformation vector field, which is regularized in order to ensure geometric continuity in accordance with the tissue characteristics of the imaged anatomic structure. In accordance with the sparse demons approach, the deformation vector field is determined only on the basis of selected image elements. Hereby, the computational speed can be increased so that the DIR and the tracking procedure using the DIR can be carried out essentially in real time.

In a demons-based DIR algorithm, the regularization of the deformation vector may particularly be carried out by filtering the deformation vector field using a Gaussian filter. Therefore, the at least one parameter may comprise a standard deviation of this Gaussian filter when such an algorithm is used in the tracking procedure.

In a further embodiment of the invention, the images are two-dimensional or three-dimensional ultrasound images. Thus, the imaging unit is configured as an ultrasound imaging unit in this embodiment.

In a further aspect, the invention suggests a method for tracking at least one anatomic structure on the basis of consecutively acquired images of a patient body by means of an image-registration based tracking procedure using at least one parameter, the anatomic structure including a plurality of implanted markers. The method comprises parameter setting steps including:

determining measured positions of the implanted markers in each image of a series of images acquired using an imaging unit, and performing an optimization procedure to determine an optimized value of the at least one parameter on the basis of deviations between the measured positions of the implanted markers as determined in the images and the calculated positions of the implanted markers as determined by means of the tracking procedure.

Moreover, the method comprises a tracking step including tracking the position of the anatomic structure in further images by means of the tracking procedure using the optimized value of the at least one parameter.

In a further aspect, the invention suggests a computer program comprising program code for causing a computer device to carry out the method when the computer program is executed in the computer device.

It shall be understood that the system of claim 1, the method of claim 12 and the computer program of claim 13 have similar and/or identical preferred embodiments, in particular as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
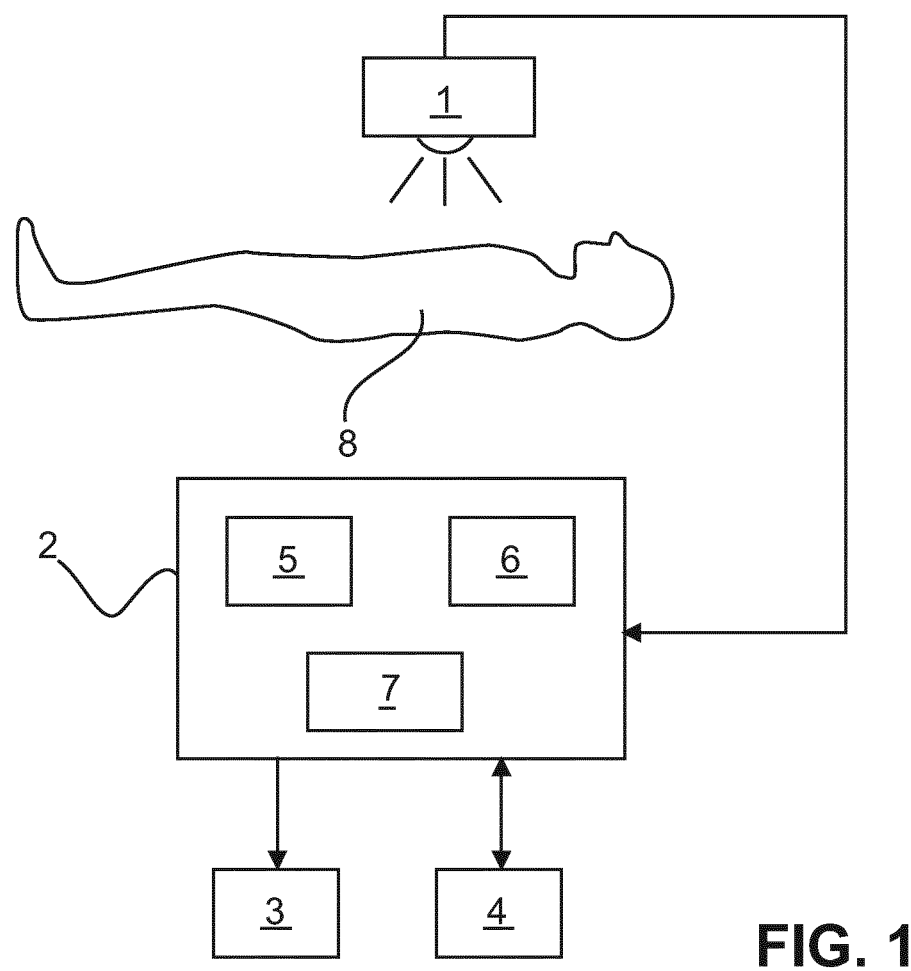
FIG. 1 schematically and exemplarily shows components of a system for tracking an anatomic structure using image registration, FIG. 2 schematically and exemplarily shows an anatomic structure including implanted fiducial markers, and FIG. 3 schematically and exemplarily illustrates steps of a calibration procedure for determining optimized values of the parameters of the tracking procedure.

FIG. 1 schematically and exemplarily shows components of a system for tracking anatomic structures in one embodiment thereof. In the following, the tracking of one anatomic structure in the system will be explained in more detail. However, it will be appreciated that multiple anatomic structures can likewise be tracked essentially in the same manner.

In one exemplary implementation, the tracking system may be used in image-guided adaptive radiation therapy for treating cancer. In radiation therapy, target structures, such as tumors, are treated by means of radioactive or electromagnetic radiation or ultrasound waves in order to control growth of or kill cancer cells. In these treatment modalities, a certain prescribed radiation dose is delivered to the target structures by means of radioactive or electromagnetic radiation or a certain prescribed thermal dose is delivered to the target structure by means of ultrasound waves or electromagnetic radiation. At the same time, the treatment is delivered in such a way that the radiation or thermal dose delivered to surrounding healthy structures, which are usually also referred to as organs at risk (OARs), is as low as possible. In order to achieve this, the treatment parameters are optimized in an initial planning procedure to deliver a prescribed radiation or thermal dose to the target structure and spare the OARs as far as possible.

However, the target structure and the OARs typically change their positions and shapes during the treatment. In adaptive radiation therapy, the relevant anatomic structures are therefore tracked on the basis of images and the treatment parameters are adapted to the position and shape changes, if necessary. The images are acquired using a suitable imaging modality, such as magnetic resonance imaging (MRI) or ultrasound (US) imaging. When the radiation therapy treatment is delivered in multiple fractions, the treatment parameters may be adapted for each fraction in order to take account of inter-fraction motion of the relevant anatomic structures. Moreover, modern adaptive radiation therapy systems also allow for adapting the treatment parameters during a fraction in real time or close to real time (i.e. only with a small delay). Thus, it is also possible to adapt the treatment parameters to intra-fraction motion.

When used in connection with this specific application, the tracking system may be integrated into a radiation therapy treatment system such as an external beam radiation therapy system, a high-intensity focused ultrasound (HIFU) treatment system or a brachytherapy system. The tracked anatomic structure may be a tumor to be treated and/or an OAR and the tracking may be carried out in order to adapt the treatment parameters to changes of the position and/or shape of the tracked anatomic structure(s) as already described above.

However, the use of the tracking system is not restricted to radiation therapy. Rather, the system may likewise be used in other applications such as, for example, in interventional procedures.

In the embodiment illustrated in FIG. 1, the tracking system comprises an imaging unit 1 for acquiring 2D or 3D images of a region of interest of a patient body 8, which includes the anatomic structure to be tracked. The imaging unit 1 may be configured in accordance with any suitable imaging modality for acquiring images of the region of interest. For instance, the imaging unit 1 may be an ultrasound unit configured for acquiring 2D or 3D ultrasound images of the region of interest in a way known to a person skilled in the art. In alternative implementations, the imaging unit 1 may be configured in accordance with another imaging modality such as, for example, computed tomography (CT) imaging or MRI.

The images acquired by means of the imaging unit 1 are provided to a tracking unit 2, which processes these images in order to track the position and shape of the relevant anatomic structure in a manner described in more detail herein below. The tracking unit 2 may be configured as a computer device comprising a processor unit for executing a computer program comprising the routines of the tracking procedure and further comprising memory for storing these routines as well as the images to be processed and further data.

In order to output the results of the tracking and to interact with the user of the system, the tracking unit 2 comprises and/or is coupled to a user interface. The user interface may include a display means 3, which may be configured as a monitor, and input means 4, such as, for example a keyboard and/or a pointing device for navigating in a graphical user interface provided on the display means 3 by the tracking unit 2.

In order to present the result of the tracking to the user, updated positions and delineations of the anatomic structure may be visualized at the display means 3 upon having determined an updated position and shape of the anatomic structure. Moreover, it may be possible to calculate and evaluate updated indicator quantities indicating the effect and success of the treatment of the anatomic structure on the basis of the updated positions and shapes of the anatomic structure as determined in the tracking unit 2.

In case of a radiation therapy treatment, such indicator quantities may particularly include a dose volume histogram (DHV) or specific DVH values for the anatomic structure. On the basis of these quantities, it can particularly be evaluated whether the treatment can still be successfully delivered on the basis of the previous treatment parameters despite the changes of the position and shape of the anatomic structure or whether these changes necessitate an adaptation of the treatment parameters.

The tracking unit 2 is configured to track the position and the shape of the anatomic structure in a series of images captured by means of the imaging unit 1. These images are also referred to as tracking images herein below. The series of images may be acquired during the radiation therapy treatment of the anatomic structure or during another procedure carried out in the treatment system comprising the tracking system.

The tracking is performed using an image registration-based tracking procedure. In order to carry out this procedure, the relevant anatomic structure may be segmented in the first image of the series of images. The segmentation may be made in a segmentation unit 5 of the tracking unit 2 in a way known to a person skilled in the art.

Further, changes of the positions and contours of the segmented anatomic structure are determined using a DIR algorithm executed in an image registration unit 6 of the tracking unit 2. In each step of the tracking procedure, the image registration unit 6 receives a new image of the series of tracking images and executes the DIR algorithm for this image so that updated positions and shapes of the anatomic structure are consecutively determined on the basis of the series of images. By means of the DIR algorithm, the image registration unit 6 determines a transformation, particularly in the form of a deformation vector field, in each step of the tracking procedure for mapping the image received in the respective step to a reference image. The transformation may then be applied to the segmented anatomic structures corresponding to the reference image in order to determine changes of their positions and shapes between the respective tracking image and the reference image.

The reference image may be the first image of the series of tracking images in each step of the tracking procedure and the corresponding segmented anatomic structure may be the segmented anatomic structure determined in the segmentation unit 5 as explained above. This approach is also referred to as frame-to-first frame tracking herein. As an alternative, the reference image used in each step of the tracking procedure may correspond to the image received in the preceding step and the anatomic structure corresponding to this image may be the transformed anatomic structure determined in the previous step. This approach is also referred to as frame-to-frame tracking herein.

The tracking unit 2 may be configured to track an anatomic structure in accordance with both approaches and the applied approach may be selected on a case-by-case basis. For instance, the frame-to-frame approach may be applied if the images can be acquired in short time intervals so that the anatomic structure undergoes only small changes between the acquisition of consecutive images and/or if the section of the anatomic structure, which is visible in the images, changes e.g. in case the images are acquired using a moving ultrasound probe). On the other hand, the frame-to-first frame approach may be applied in case the tracked anatomic structure is completely visible in all tracking images. It is an advantage of this approach that it prevents the accumulation of tracking errors over time.

In principle, any DIR algorithm known to a person skilled in the art may be applied in the image registration unit 6. Preferably, the DIR algorithm comprises, as a pre-processing step, a filtering step for smoothing the received images and the reference images of the DIR. For this purpose, a smoothing filter may be applied to each received image, which particularly removes high-frequency features from the image in order to reduce image noise. The smoothing filter may be configured in any suitable manner known to a person skilled in the art. For instance, the smoothing filter may be configured as a Gaussian filter. However, other smoothing filters may likewise be applied at an alternative.

The smoothing filter may include a smoothing parameter which specifies the amount of smoothing. In particular, the smoothing filter may generate a filter value for each image element (i.e. for each pixel of a 2D image or each voxel of a 3D image) by determining a weighted average of the unfiltered value and the (unfiltered) values of surrounding image elements and the filter parameter may determine the respective weights of the filter values of the surrounding image elements. In case of a Gaussian smoothing filter, the filter parameter may particularly correspond to the standard deviation. In case the smoothing filter is configured in another way, the filter parameter may correspond to another parameter influencing the amount of smoothing.

Upon having applied the smoothing filter to the images, the image registration unit 6 determines the transformation for mapping the image received in the respective step of the tracking procedure to the reference images. For this purpose any suitable DIR algorithm known to a person skilled in the art may be applied. The DIR algorithm may particularly involve an elasticity parameter, which quantifies an estimated elasticity of the tracked anatomic structure. The estimated elasticity determines the amount of changes of the shape of the anatomic structure which are possible. For instance, in case the tracked anatomic structure is a bone the estimated elasticity is lower than in case the tracked anatomic structure is the prostate.

In one embodiment the image registration unit 6 applies to a demons-based DIR algorithm. Such algorithms are known to the person skilled in the art. In these algorithms, image entities of a reference image act as local forces moving image elements of the image to be deformed. This image is transformed on the basis of a deformation vector field, which includes deformation vectors describing the transformation of the image elements and which is to be determined in the DIR algorithm. The deformation vector field is regularized in order to ensure geometric continuity in accordance with the tissue characteristics of the imaged anatomic structure(s) which are deformed so that an elastic-like deformation is achieved. The regularization may particularly be carried out by applying a Gaussian filter to the deformation vector field.

When a demons-based approach is applied, the elasticity parameter of the tracking procedure particularly corresponds to the standard deviation $\sigma$ which is used in the regularization of the deformation vector field on the basis of the Gaussian filter. This standard deviation has to be selected such that the elastic-behavior achieved by the filtering corresponds to the actual behavior of the tissue of the imaged anatomic structure in accordance with its elasticity.

In one specific implementation, the DIR algorithm applied by the image registration unit 6 implements the sparse demons approach as particularly described in O. Somphone et al., "Fast myocardial motion and strain estimation in 3D cardiac ultrasound with sparse demons" Proceedings of ISBI'13, 2013, pages 1182-1185, DOI: 10.1109/ISBI.2013.6556691, and in O. Somphone et al, "Live feature tracking in ultrasound liver sequences with sparse demons" Proceedings of MICCAI'14 workshop, 2014, pages 53-60.

In accordance with this approach, the deformation vector field u is found by minimizing an energy E defined for a finite number of image elements $x_i$ and given by:

$$E = \sum_i \int_\Omega \delta(x - x_i) D[R(x) - T(x + u(x))] dx \quad (1)$$

where R and T are the reference image and the image to be transformed respectively, $\Omega$ is the image domain and $\delta$ is the Dirac function. D is a function which penalizes the dissimilarity between the reference image and the transformed image and may be given by $D(x)=x^2/2$, for example. The image elements $x_i$ are suitably selected prior to the execution of the tracking procedure. In so doing, image elements on edges may be selected rather than image elements in flat regions. Moreover, the larger number of selected image elements $x_i$ preferably belong the anatomic structure to be tracked rather than to other structures shown in the images. In particular, image elements may be selected which belong to the fiducial markers used in the calibration procedure described herein below.

For the deformation vector field u, a fluid-like regularization may be used which may be approximated by Gaussian filtering. In this case, the deformation vector field u corresponds to the result of a convolution of an auxiliary field v with a Gaussian kernel $w_\sigma$ including the standard deviation $\sigma$. Thus, the deformation vector field u is given by $$u(x) = \int_\Omega w_\sigma(x-y)v(y)dy, \quad (2)$$

and the Gaussian kernel may be calculated as $$w_\sigma(x) = \frac{1}{2\pi\sigma^2}e^{|x|/(2\sigma^2)}. \quad (3)$$

In order to determine the deformation vector field u, the energy E may be minimized with respect to the auxiliary field v and, then, the deformation vector field u may be derived from the auxiliary field v minimizing the energy E in accordance with the equations 2 and 3. The deformation vector field minimizing the energy E may determined using a gradient descent approach, for example, particularly as described in the publications by O. Somphone et al.

Since the energy function only has to be evaluated for a finite number of image elements in the sparse demons approach, this approach ensures a particularly fast DIR algorithm. On the basis of this DIR algorithm, it is particularly possible to track the anatomic structure essentially in real time. Thus, if the positions and delineations are visualized by the tracking system, these visualizations essentially reflect the actual position and shape of the anatomic structure, and, if indicator quantities are calculated, these quantities essentially reflect the actual situation at the time of the calculation.

When the sparse demons approach is applied, the elasticity parameter of the DIR algorithm particularly corresponds to the standard deviation σ of the Gaussian kernel used for the regularization of the deformation vector field. In this respect, the sparse demons approach corresponds to other demons-based approaches as described above.

In the tracking unit 2, the parameters of the DIR algorithm are determined prior to the execution of the tracking procedure in a calibration procedure carried out in a calibration unit 7. In the exemplary implementation of the tracking procedure described above, the parameters include the filter parameter of the smoothing filter and elasticity parameter of the DRI algorithm.

Figure 2:
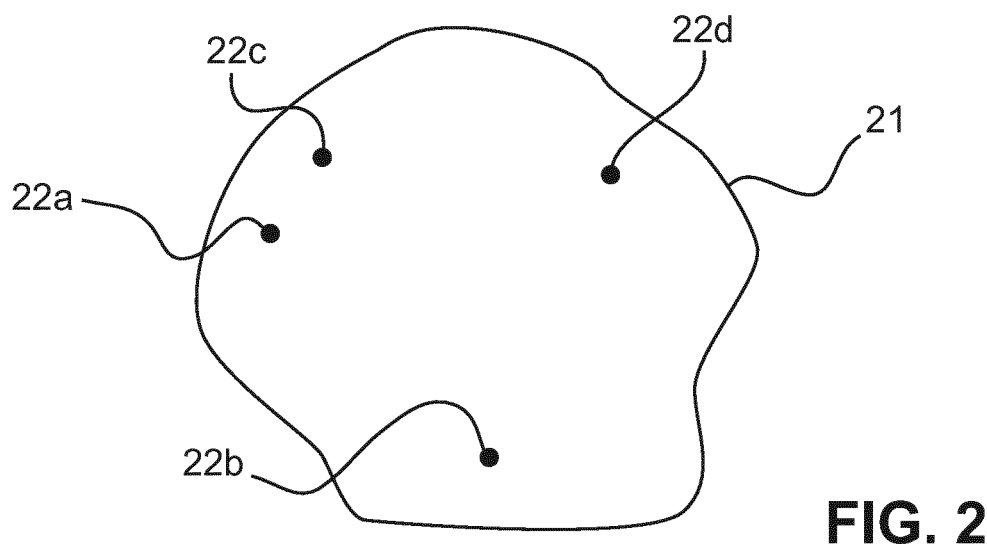

In order to perform the calibration procedure, multiple fiducial markers are implanted into the anatomic structure to be tracked beforehand. The markers may be implanted into the anatomic structure in an interventional procedure which may be configured as a minimally invasive procedure. In particular, the markers may be implanted using needles which are inserted into the anatomic structure to be tracked in order to deliver the fiducial markers to the locations corresponding to the needle tips. The fiducial markers are configured such that they are clearly visible and identifiable in the images acquired by the imaging unit 1. For this purpose, the shapes of the markers are suitably selected, where the shape of all markers may be identical or where the markers may have different shapes. Moreover, the material of the fiducial markers is suitably selected. In particular, the fiducial markers may be made of metal in case the imaging unit 1 is configured as an US or CT apparatus. In FIG. 2, an anatomic structure 21 including fiducial markers 22a, 22b, 22c and 22d is schematically illustrated by way of example.

In view of the calibration procedure, the number of fiducial markers implanted into an anatomic structure to be tracked and their positions are in principle not crucial. However, the markers should be sufficiently spread-out over the volume of the structure in order to determine the parameters of the tracking procedure under consideration of the translation and deformation properties of substantially all regions of the structure. Moreover, if all or some markers have an identical shape, the markers are preferably positioned such that the distance between them is larger than their expected displacement in order to allow for identifying each marker in the images acquired in the calibration procedure.

In the calibration procedure, a series of two or more images of the region of interest including the anatomic structure to be tracked is acquired using the imaging unit 1 and the images are forwarded to the tracking unit 2 and particularly to the calibration unit 7 included therein. The images are preferably acquired under comparable circumstances as during the actual tracking of the anatomic structure. In particular, the anatomic structure preferably undergoes similar position and shape changes as during the actual tracking.

In the calibration unit 7, the fiducial markers are identified in the images and their positions $p_{i,n}$ are determined, where $p_{i,n}$ denotes the position of the i-th fiducial marker in the n-the image of the series of images in the following.

Preferably, the fiducial markers are identified automatically in this process. Using suitably configured fiducial markers, this may easily be made on the basis of a threshold of image values, for example. However, the invention is not limited to an automatic approach and it is likewise possible that the fiducial markers are identified manually by the user of the tracking unit 2 (e.g. by marking the fiducial markers in the images when they are presented at the display means 3).

As said above, the markers may be positioned with a distance between them which is larger than their displacement in case the markers have an identical shape. In this case, each individual marker visible at one position in a certain image of the series of images corresponds to the nearest marker in the preceding or subsequent image so that each individual marker can be easily tracked on the basis of its position. This may be done using a suitable automatic algorithm, such as a k-nearest neighbors algorithm, for example. In case the markers have different shapes, each individual marker can be identified in all images of the series of images on the basis of its shape.

Further, the DIR algorithm is applied to the series of images in the image registration unit 6 on the basis of variable values of the parameters of the DIR algorithm. In so doing, the image registration unit 6 determines deformation vector fields for mapping each of the images of the series of images (except for the first image) to a reference image on the basis of variable parameter values. As explained above, the reference image may correspond to the first image of the series of images for each subsequent image of the series or the reference image may correspond the preceding image in the series for each image of the series (except for the first image).

On the basis of the deformation vector fields, the calibration unit 6 may then determine calculated positions $q_{i,n}$ of the markers for each image of the series of images, which correspond to the positions of the markers in the image deformed using the deformation vector field. In other words: The calculated positions $q_{i,n}$ correspond to the positions of the fiducial markers as they would be determined by means of the tracking procedure when used for tracking the markers on the basis of the variable parameter values.

In this process, the calculated positions $q_{i,n}$ are effectively functions of the parameter values of the DIR algorithm. For each image of the series of images (except for the first image), these calculated positions $q_{i,n}$ of the fiducial markers are compared with the actual positions $p_{i,n}$ which are directly determined in the respective image in the calibration unit 7 and which are also referred to as measured positions herein. On the basis of the corresponding comparisons for all images of the series of images (except for the first image), the calibration unit further determines optimized values of the parameters of the DIR algorithm such that the differences between the calculated positions $q_{i,n}$ of the fiducial markers and their measured positions $p_{i,n}$ are minimized.

For this purpose, the calibration unit 7 may minimize a cost function which may depend on the difference between the calculated positions and the measured positions of the fiducial markers. One exemplary cost function particularly includes the sum of the differences between the calculated positions and the measured positions of all markers for all images. Thus, the calibration unit 7 may minimize a cost function F which is given by:

$$F(\tau) = \sum_{i,n} |q_{i,n}(\tau) - p_{i,n}|$$

where $\tau$ denotes the parameters of the DIR algorithm. By minimizing this cost function with respect to the parameters $\tau$, optimized parameters can be found which minimize the differences between the calculated positions $q_{i,n}$ of the fiducial markers and their measured positions $p_{i,n}$ In other embodiments, the cost function may be configured differently. For instance, it may include the same of the squares of the differences between the calculated positions and the measured positions of all markers for all images.

In order to find the optimized parameters on the basis of the cost function specified above or another suitable cost function, the calculated positions $q_{i,n}$ may be determined using preliminary values of the parameters several times and the parameters values resulting in the minimum deviation between the calculated positions $q_{i,n}$ and the measured positions $p_{i,n}$ of the fiducial markers may be selected.

In one related implementation, a "brute force" approach may be applied for this purpose. In accordance with this approach, a large number of different combinations of parameter values may be tested by calculating a large number of sets of calculated positions $q_{i,n}$, where each set of calculated positions is determined using one parameter combination and where each parameter configuration comprises one value of each relevant parameter. Then, the parameter combination may be selected which results in the smallest deviation between the calculated positions $q_{i,n}$ and the measured positions $p_{i,n}$ of the fiducial markers.

In a further implementation, the optimized parameter combination may be determined using an iterative optimization algorithm. Such an algorithm allows for finding the optimal parameter combination in a more targeted way and, thus, with less computational resources. One example of such an optimization algorithm, which may be used here, is a gradient descent algorithm as known the person skilled in the art.

Upon having determined the optimized parameter values, these parameters values are provided to the image registration unit 6 and the image registration unit 6 uses these parameters for tracking the anatomic structure as explained above.

By means of the calibration procedure described above, the parameters of the DIR algorithm can be adapted to the special situation in which the relevant anatomic structure is tracked. In particular, the filter parameter can be adapted to the image quality of the images acquired by means of the imaging unit 1, especially to the noise included in these images. Moreover, the elasticity parameter can be adapted to the characteristics of the tissue of the anatomic structure to be tracked, especially to the elasticity of the tissue. Hereby, a more accurate image registration-based tracking of the anatomic structure can be achieved.

Figure 3:
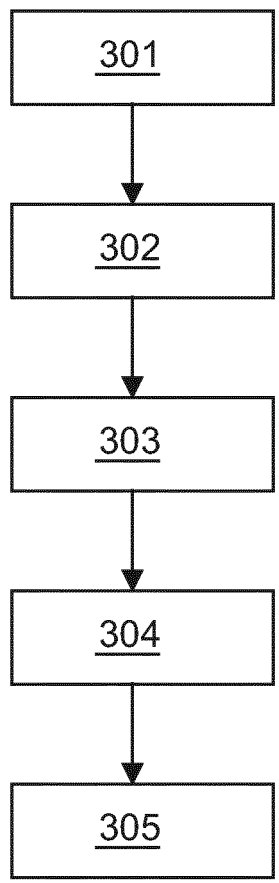

FIG. 3 schematically and exemplarily illustrates steps of the calibration procedure for determining optimized parameters for the tracking procedure. In step 301, fiducial markers are implanted in the anatomic structure to be tracked. Then, a series of images of the anatomic structure are acquired by means of the imaging unit 1 in step 302. Further, the actual positions of the fiducial markers are determined in the acquired images in step 303. Then, calculated positions of the fiducial markers are determined using the tracking procedure with variable parameter values and the parameter values are optimized such that deviations between the actual positions and the calculated positions of the fiducial markers are minimized in step 304. Thereupon, the parameters of the tracking procedure are set to the optimized values so that a subsequent tracking of the anatomic structure can be accurately carried out on the basis of the optimized parameter values (step 305).

In step 304, the calculated positions may be determined for a plurality of combinations of possible values of the parameters and the combination resulting in the smallest deviations between the deformed values and the actual values may be selected. In accordance with an alternative approach, an iterative optimization algorithm, such as, for example, a gradient descent algorithm may be used for determining the optimized parameters.

In the examples explained above, the DIR algorithm uses the sparse demon approach. However, the invention is not limited to this approach and may likewise be applied in essentially the same way to other DIR algorithms known to a person skilled in the art, including other demons-based DIR algorithms and further DIR algorithms not using demons. These algorithms typically also include parameters, such as a filter parameter and an elasticity parameter, which may be optimized by means of the calibration procedure described above.

Moreover, the invention may be applied in connection with the image registration-based tracking of anatomic structures in any application. As said above, one application is adaptive radiation therapy in which the treatment parameters on the basis of which radiation is delivered may be adapted on the basis of changes of the position and shape of the target structure and/or the OARs. However, the invention may likewise be applied to tracking procedures used in other treatment procedures.

Furthermore, the invention is not limited to the image registration-based tracking using images acquired using a special imaging modality. Rather, the calibration procedure described above may be applied in connection with any imaging modality known to the person skilled in the art. In order to use the calibration procedure with a particular imaging modality it only has to be ensured that the fiducial markers are configured such that they are clearly visible in the images captured using the respective imaging modality.

In the preferred embodiments described above, the images used for determining the parameters of the tracking procedure are acquired using the same imaging unit 1 which is also used for acquiring the images used for the actual tracking of the anatomic structure. As explained, this allows for an adaption of the parameters, particularly the smoothing parameter, to this imaging unit 1. However, the images used for determining the parameters and the images used for the actual tracking of the anatomic structure may also be acquired using a different imaging units. These imaging units are preferably configured in accordance with the same imaging modality so that the images comprise a comparable amount of noise. In this case, a reliable adaptation of the smoothing parameter is likewise possible.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A system for tracking at least one anatomic structure in consecutively acquired images of a patient body by means of an image-registration based tracking procedure using at least one parameter, the anatomic structure including a plurality of implanted markers and the system comprising:
   a memory comprising a parameter setting program and a tracking program; and
   a processor, the processor configured to execute the parameter setting program to:
      determine measured positions of the implanted markers in each image of a series of more than two images acquired using an imaging unit; and
      perform an optimization procedure to determine an optimized value of the at least one parameter on the basis of deviations between the measured positions of the implanted markers as determined in the images and calculated positions of the implanted markers as determined on the basis of the images by means of the tracking procedure using a variable value of the at least one parameter; and
   the processor further configured to execute the tracking program to track the position of the anatomic structure in further images by means of the tracking procedure using the optimized value of the at least one parameter.

2. The system of claim 1, wherein the series of images and the further images are acquired using the same imaging unit or imaging units of the same type.

3. The system of claim 1, wherein the tracking procedure comprises smoothing the images by applying a smoothing filter and wherein the at least one parameter comprises a filter parameter of the smoothing filter.

4. The system of claim 3, wherein the filter parameter specifies an amount of smoothing.

5. The system of claim 3, wherein the smoothing filter is configured as a Gaussian filter and wherein the filter parameter corresponds to a standard deviation of the Gaussian filter.

6. The system of claim 1, wherein the at least one parameter comprises an elasticity parameter quantifying an elasticity of the at least one anatomic structure.

7. The system of claim 1, wherein the tracking procedure involves a deformable image registration between each of the further images and a reference image on the basis of a deformation vector field, the deformation vector field being regularized on the basis of a filter function, and wherein the at least one parameter comprises a parameter of the filter function.

8. The system of claim 7, wherein the deformable image registration is carried out on the basis of a demons algorithm, particularly on the basis of a sparse demons algorithm.

9. The system of claim 7, wherein the filter function corresponds to a Gaussian filter and the at least one parameter comprises a standard deviation of the Gaussian filter.

10. The system of claim 1, wherein the optimized value of the at least one parameter is determined by minimizing a cost function depending on differences between the measured positions of the markers and the calculated positions of the implanted marker.

11. The system of claim 1, wherein the images are two-dimensional or three-dimensional ultrasound images.

12. A method for tracking at least one anatomic structure on the basis of consecutively acquired images of a patient body by means of an image-registration based tracking procedure using at least one parameter, the anatomic structure including a plurality of implanted markers and the method comprising:
   parameter setting steps including:
      determining measured positions of the implanted markers in each image of a series of more than two images acquired using an imaging unit; and
      performing an optimization procedure to determine an optimized value of the at least one parameter on the basis of deviations between the measured positions of the implanted markers as determined in the images and the calculated positions of the implanted markers as determined by means of the tracking procedure; and
   a tracking step including tracking the position of the anatomic structure in further images by means of the tracking procedure using the optimized value of the at least one parameter.

13. A non-transitory computer readable medium comprising a computer program comprising program code for causing a computer device, when the computer program is executed in the computer device, to:
   determine measured positions of the implanted markers in each image of a series of more than two images acquired using an imaging unit;
   perform an optimization procedure to determine an optimized value of the at least one parameter on the basis of deviations between the measured positions of the implanted markers as determined in the images and the calculated positions of the implanted markers as determined by means of the tracking procedure; and
   track the position of the anatomic structure in further images by means of the tracking procedure using the optimized value of the at least one parameter.

* * * * *